United States Patent
Upadhyaya et al.

(10) Patent No.: US 6,941,225 B2
(45) Date of Patent: Sep. 6, 2005

(54) METHOD AND APPARATUS FOR ULTRA PRECISE GPS-BASED MAPPING OF SEEDS OR VEGETATION DURING PLANTING

(75) Inventors: Shrini Upadhyaya, Davis, CA (US); Mohammad Ehsani, Columbus, OH (US); Mark L. Mattson, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 334 days.

(21) Appl. No.: 10/358,088

(22) Filed: Feb. 3, 2003

(65) Prior Publication Data

US 2003/0159633 A1 Aug. 28, 2003

Related U.S. Application Data

(63) Continuation of application No. 09/895,853, filed on Jun. 29, 2001, now Pat. No. 6,516,271, and a division of application No. 09/895,851, filed on Jun. 29, 2001, now Pat. No. 6,553,312.

(51) Int. Cl.[7] .............................................. G01C 21/00
(52) U.S. Cl. ..................... 701/213; 701/208; 56/10.2 A; 56/10.2 R
(58) Field of Search .......................... 701/50, 207, 208, 701/213, 214; 56/10.2 R, 10.2 A (56) References Cited

U.S. PATENT DOCUMENTS

| | | | |
|---|---|---|---|
| 5,260,875 A | 11/1993 | Tofte et al. | |
| 5,279,068 A | 1/1994 | Rees et al. | |
| 5,572,218 A | 11/1996 | Cohen et al. | |
| 5,585,626 A | 12/1996 | Beck et al. | |
| 5,621,666 A | 4/1997 | O'Neall et al. | |
| 5,646,846 A | 7/1997 | Bruce et al. | |
| 5,751,576 A | 5/1998 | Monson | |
| 5,771,169 A | 6/1998 | Wendte | |
| 5,837,997 A | 11/1998 | Beck et al. | |
| 5,878,371 A | 3/1999 | Hale et al. | |
| 5,913,915 A | 6/1999 | McQuinn | |
| 5,915,312 A | 6/1999 | Meyer et al. | |
| 5,991,694 A | 11/1999 | Gudat et al. | |
| 6,009,354 A | 12/1999 | Flamme et al. | |
| 6,041,582 A | 3/2000 | Tiede et al. | |
| 6,061,618 A | 5/2000 | Hale et al. | |
| 6,070,538 A | 6/2000 | Flamme et al. | |
| 6,070,539 A | 6/2000 | Flamme et al. | |
| 6,079,340 A | * 6/2000 | Flamme et al. | 111/178 |
| 6,122,581 A | 9/2000 | McQuinn | |
| 6,199,000 B1 | 3/2001 | Keller et al. | |
| RE37,256 E | 7/2001 | Cohen et al. | |
| 6,516,271 B2 | 2/2003 | Upadhyaya et al. | |
| 6,553,312 B2 | * 4/2003 | Upadhyaya et al. | 701/213 |
| 6,570,534 B2 | 5/2003 | Cohen et al. | |

OTHER PUBLICATIONS

Ehsani, M.R., et al.; An Ultra–Precise, GPS Based Planter for Site–Specific Cultivation and Plant Specific Chemical Application, Paper No. 003065, 2000 ASAE Meeting, Milwaukee, Wisconsin, pp. 30–41, no date.

Ehsani, M.R. et al.; An Ultra–Precise, GPS Based Planter for Site–Specific Cultivation and Plant Specific Chemical Application, Fifth International Conference on Precision Agriculture, Minneapolis, Minnesota (In Press), pp. 42 thru 50, no date.

* cited by examiner

Primary Examiner—Yonel Beaulieu
(74) Attorney, Agent, or Firm—John P. O'Banion (57) ABSTRACT

An ultra precise seed planter apparatus and method for generating a centimeter accuracy map of the location of seeds or vegetation as they are planted from an agricultural planting machine. The apparatus is fitted with a GPS receiver feeding a data logger, and optical sensors that are placed adjacent seed or vegetation dispenser. The data logger monitors GPS time and UTM coordinates, as well as the optical sensors. Ground speed and azimuth are also monitored. The seeds or vegetation are time-tagged as they are dispensed, and software is used to process the dispensing time and GPS location data and estimate the exact coordinates of each seed or plant and its distance from adjacent seeds or plants. As a result, a precise planting map is generated. The invention may also be used to determine the location to dispense seeds or vegetation, and activating the dispenser when that location is reached.

61 Claims, 4 Drawing Sheets

METHOD AND APPARATUS FOR ULTRA PRECISE GPS-BASED MAPPING OF SEEDS OR VEGETATION DURING PLANTING

CROSS-REFERENCE TO RELATED APPLICATIONS

This application is a continuation of application Ser. No. 09/895,853 filed on Jun. 29, 2001, now U.S. Pat. No. 6,516,271, incorporated herein by reference, and a divisional of application Ser. No. 09/895,851 filed on Jun. 29, 2001, now U.S. Pat. No. 6,553,312, incorporated herein by reference.

STATEMENT REGARDING FEDERALLY SPONSORED RESEARCH OR DEVELOPMENT

Not Applicable

REFERENCE TO A COMPUTER PROGRAM APPENDIX

Appendix A "Data Acquisition Program" and Appendix B "Seed Mapping Program" referenced herein are contained in the enclosed compact disc in a file entitled "UC00-174-2.txt" created on Feb. 3, 2003 and having a 24 kb file size. The computer program code, which exceeds 300 lines, is submitted on compact disc in accordance with 37 CFR 1.52. Two compact discs are provided according to 37 CFR 1.52(e)(4). Appendix A and Appendix B contained on the compact disc are incorporated by reference herein.

BACKGROUND OF THE INVENTION

1. Field of the Invention

This invention pertains generally to precision farming methods, and more particularly to ultra-precise (i.e., centimeter accuracy), Global Positioning System (GPS) based mapping of seeds and vegetation while dispensed from a planter for site-specific cultivation and plant specific chemical application.

2. Description of the Background Art

Successful agricultural enterprises seek to optimize crop production while minimizing the input costs of applying herbicides and fertilizers and other activities thereby maximizing the profits realized from a particular crop. It is common practice for the typical farmer to apply pesticides or fertilizers uniformly throughout the field even though less than 50% of land area is covered by the target foliage. Precision farming techniques such as yield monitoring, variable rate applications, crop and soil property sensing etc. can allow a reduction in the application of chemical pesticides and fertilizers by delivering the chemical to the crop plant rather than the entire field. The annual application of pesticides and fertilizers by agriculturalists in the United States alone is substantial. For example in 1989, over 800 million pounds of pesticides were used in US agriculture. Accordingly, targeted spray can lead to a huge reduction of chemical input into US agriculture. This approach not only reduces the cost of chemicals, but also reduces the pesticide load on the environment, particularly on ground water and streams. Such precision techniques have had limited success because they are often man-power intensive to assure accuracy.

One of the key elements that aided the development of precision farming techniques is the ability to "accurately" determine the locations within a field using GPS technology. Sub-meter accuracy offered by early GPS systems that utilized differential corrections (DGPS), has been satisfactory for many precision farming applications where sub-meter accuracy is acceptable.

The recent development of real-time kinematics (RTK) based GPS systems have made it possible to determine field positions with an accuracy of 1 centimeter. The application of this technology to agriculture can have tremendous economic and environmental benefits. The centimeter accuracy of the RTK based GPS technology allows the movement from site-specific precision farming with sub-meter accuracy to plant-specific ultra-precision farming with centimeter accuracy.

Many different types of autonomous systems have been attempted for use with agricultural vehicles. One system used radio frequency to guide a tractor with an accuracy of less than 5 centimeters. Another utilized a laser guidance system to achieve an accuracy of less than 6 millimeters. Image analysis systems using a video camera have also been developed, some reporting accuracy of around 7 millimeters at low weed loads and 12 millimeters at high weed loads with permitted speeds up to 16 kilometers per hour. Other imaging based systems utilize a color vision system to discriminate between plants and weeds to allow differential spraying. However, since optical discrimination between plants and weeds using image analysis to extract relevant features is computationally intensive, these systems must employ very low ground speed. Mechanical systems have also been developed using a leader cable system for reliable tractor guidance or implemented a mechanical contact type guidance system for use in green houses. Other systems use a combination of ultrasonic and dead reckoning to guide a tractor. Finally, other precision farming systems have used RTK GPS for vehicle guidance because of its technical superiority and economic advantages compared to all other systems.

Accordingly, a need exists for accurate and inexpensive precision farming techniques that can efficiently identify the location of seeds and plants within a field for selective application of pesticides and fertilizers and tilling without causing operator fatigue or having large man-power requirements. The present invention satisfies that need, as well as others, and generally overcomes the deficiencies found in existing equipment.

BRIEF SUMMARY OF THE INVENTION

The present invention is a method and system for generating a centimeter accuracy map of the location of seeds or vegetation as they are planted from an agricultural planting machine.

By way of example, and not of limitation, in accordance with an embodiment of the invention a planting machine such as a Salvo 650 vacuum planter, is fitted with a centimeter accuracy RTK GPS receiver feeding a data logger, and optical sensors are placed adjacent the planter shoes to detect seeds as they fall through the seed tubes. Alternatively, micro-switches or other sensors could be used to sense transplants as they are planted. The data logger monitors GPS time and UTM coordinates, as well as the optical sensors. Ground speed and azimuth can also be monitored. The seeds are time-tagged as they fall through the seed tubes, and software is used to process the seed dispensing time and GPS location data and estimate the exact coordinates of each seed and its distance from adjacent seeds. This information is then used to generate a planting map. It should be recognized, however, that it is not necessary to use centimeter accuracy RTK GPS for time tagging seeds as they are planted. Any centimeter accuracy GPS could be used, and data may be post-processed to generate a planting map.

In accordance with another embodiment of the invention, the sensors are omitted. Instead of sensing seeds falling through the seed tubes, the invention controls the seed dispensing operation. In this embodiment of the invention, RTK GPS is used to determine when the seed dispenser is above the desired planting location. When the desired location has been reached, the invention activates the seed dispenser to drop the seed. This can be accomplished by, for example, cutting off the vacuum on a vacuum metering plate commonly used in vacuum planters. By dropping the seeds at the desired location in this manner, check row planting is made possible. The planting map generated in this embodiment is essentially the same as before, except that the invention determines the locations for seeds rather than senses the locations for the seeds.

Once the planting map is generated, the map can then be used for a variety of purposes such as applying pesticides directly to the plants, cultivating, plant thinning, and other field operations. In addition, by further employing a greenness sensor to detect green plants and identify those plants (e.g., weeds) which are not a part of the original seed/plant map, chemical or non-chemical (such as biological) herbicides can be selectively applied to control weeds. Additionally, mechanical cultivation, pulsed electrical shock, and flame weeding is also made possible on an automated basis. Vegetative mass where plants are not expected on the plant map can be cultivated or otherwise destroyed. Further, seed application can be controlled during planting.

Thus, it can be seen that accuracy in seed placement makes it possible to develop an accurate seed map that can be used to target chemical application and/or mechanical cultivation thus reducing the cost of production and protecting the environment. Moreover, such seed maps can assist in autonomous vehicle guidance, which can reduce operator fatigue as well as improve machinery performance by reducing overlap during field operations such as tillage, chemical application, etc.

An object of the invention is to provide a system for identifying accurate plant locations using global positioning system data and creating a virtual plant map.

Another object of the invention is to provide a method for seed mapping using centimeter accuracy global positioning system.

Another object of the invention is to provide a system that reduces the amount of fertilizers and pesticides and the like that is applied to a field by permitting plant and location specific applications.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus and methods that are generally shown in FIG. 1 through FIG. 4. It will be appreciated that the apparatus may vary as to configuration and as to details of the parts, and that the method may vary as to the specific steps and sequence, without departing from the basic concepts as disclosed herein.

Figure 1:
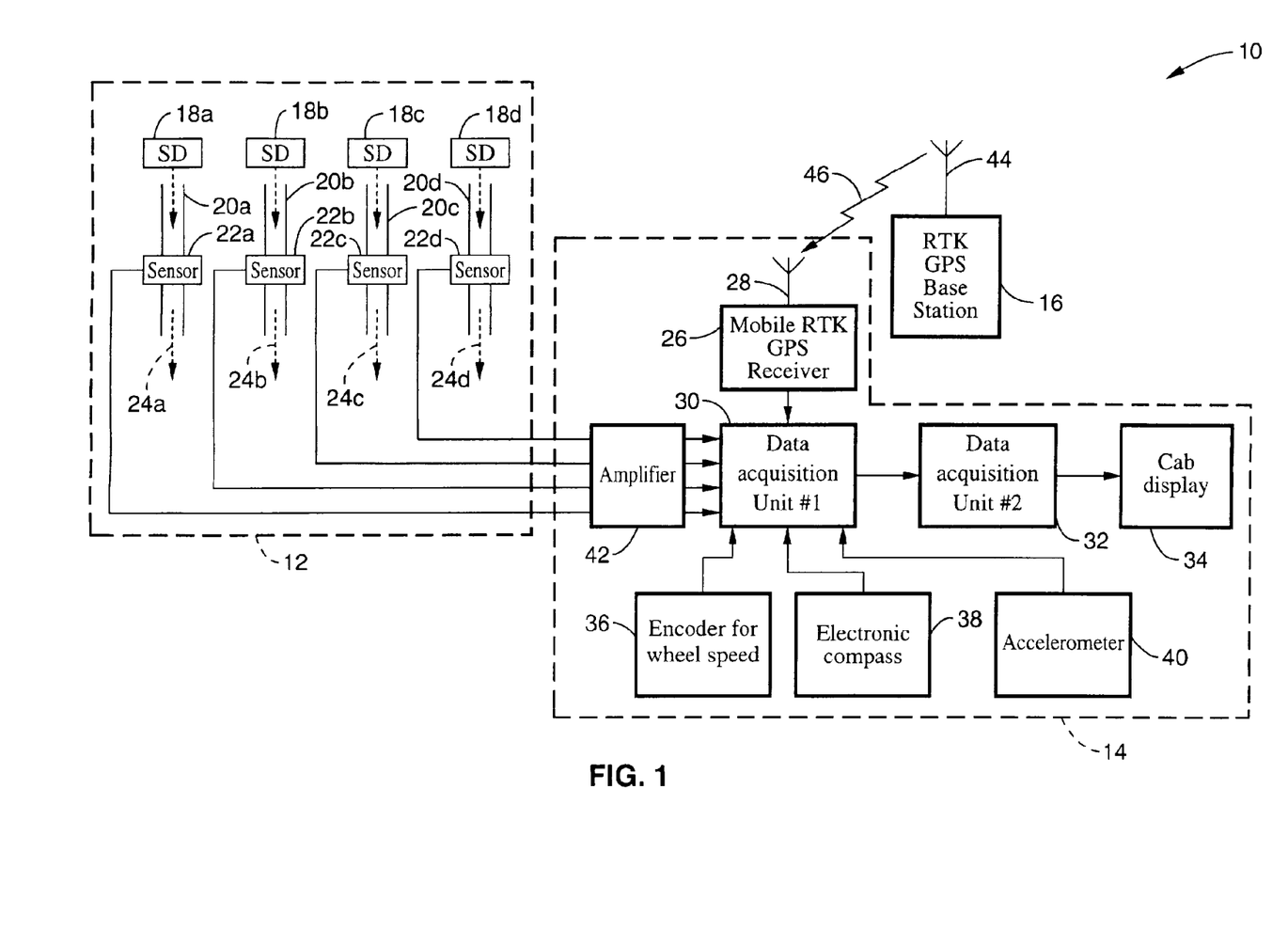
FIG. 1 is a schematic diagram of an embodiment of a GPS based planting system according to the present invention.

Referring first to FIG. 1, a GPS based planter system 10 according to the present invention comprises a planter vehicle 12, a data acquisition system 14, and a GPS base station 16, the details of a preferred embodiment of which are set forth below.

Planter vehicle 12 is a conventional seed planter or the like, such as a Salvo 650 vacuum planter, or a conventional vegetation planter or the like. Various planter configurations can be used, such as integrated vehicle/planter units, towed planter units or the like. The details of planters, which are well known, are not presented herein. For purposes of the embodiment of the present invention described herein, it is sufficient to note that such planters typically include seed or vegetation dispensers. Depending on the type of planter unit employed, the dispensers may include a cut-off vacuum mechanism that holds the seeds or vegetation on a metering plate prior to being dispensed.

In FIG. 1, four seed dispensers 18a, 18b, 18c, 18d and associated tubes 20a, 20b, 20c, 20d are depicted by way of example. In accordance with the present invention, optical sensors 22a, 22b, 22c, 22d are placed adjacent to the seed tubes 20a, 20b, 20c, 20d to sense seeds 24a, 24b, 24c, 24d falling through the tubes during planting. Preferably, optical sensors 22 are mounted directly above planter shoes (not shown) to detect seeds 24 as they fall through tubes 20 and to the ground. Optical sensors 22 are typically conventional photoelectric sensors, and are preferably configured to detect any desired material that passes through the window of the sensor within a range selected by the type of seed that is to be planted. The sensor range is preferably adjustable so that the sensors can see objects that are the size of a corn, tomato or other seed, but not see dust particles. Note that, although the term "seeds" is used herein, it will be understood that the invention is not limited to use with seed dispensing planters, but is also applicable to equipment for planting bulbs, seedlings, tubers, transplants, or other plant material.

Data acquisition system 14, which would typically be mounted on the planter vehicle, comprises a GPS receiver 26 and associated antenna 28, a first data acquisition unit 30, a second data acquisition unit 32, a cab display 34, a wheel speed encoder 36, an electronic compass 38, an accelerometer 40, and a sensor amplifier 42. Note that some of these components are optional, as will be described below. Note also that planting vehicle 12 may be towed by a tractor fitted with an RTK GPS autonomous guidance system. In that case, the GPS equipment (e.g., receiver and antenna) on the tractor can be used instead of installing GPS receiver 26 and antenna 28 on planting vehicle 12.

GPS receiver 26 is preferably a mobile real time kinematic (RTK) global positioning system (GPS) receiver that is interfaced with first data acquisition unit 30. First data acquisition unit 30, which preferably comprises a conventional data logger that includes a central processing unit (CPU), appropriate input/output (I/O), memory, and associated software, acquires, processes and maps data in real-time. First data acquisition unit 30 preferably obtains the UTC time and UTM coordinates every second and stores data with a reference time (time-tag). First data acquisition unit 30 also monitors optical sensors 22 and time-tags the deposition of the seeds and stores the information into memory.

First data acquisition unit 16 is optionally interfaced second data acquisition unit 32 that in turn drives cab display 34. Second data acquisition unit 32 monitors first data acquisition unit 30 and textually or graphically reports the performance of the planter through display 34. Encoder 36 is optionally positioned on planter vehicle 12 to sense wheel rotation, and feeds pulse signals to first data acquisition unit 30 for the purpose of computing vehicle speed. Alternatively, vehicle speed can be determined by radar though not as accurately. Electronic compass 38 is optionally included for sensing azimuth. Encoder 36 and compass 38 can be used to improve system accuracy when the quality of the GPS signal is poor. Accelerometer 40 is optionally included for sensing planter vehicle dynamics. Amplifier 42 is optionally included strengthen and/or condition the signals from sensors 22 before being processed by first data acquisition unit 30.

Base station 16 is preferably an RTK GPS base station that serves as a reference point for the system. An antenna 44 associated with base station 16 is precisely positioned at a reference location with respect to the field in which planting will take place. Base station 16 then sends GPS reference signals 46 to GPS receiver 26 for error correction to achieve centimeter accuracy compared with the accuracy achieved with the signals directly from the satellites. In one embodiment, antenna 44 may be vertically adjustable to improve signal quality. Base station 16 is preferably installed in the field at a permanent location. In one embodiment, the location is identified by a punch mark on top of a machined metal rod embedded in concrete located near the agricultural plots. The machined rod is preferably placed and set at a surveyed point from known geographic survey points so the exact location of the field base station seen can be determined. Antenna 44 may then be mounted to a tripod that is precisely positioned with respect to the metal rod. Alternatively, antenna 44 may be fixed to a permanent structure such as a pole, post or tower that has preferably been fixed at a specific surveyed location.

Although RTK GPS is used to illustrate the preferred geographic positioning system according to the present invention, it will be understood that the present invention may be adapted to work with other satellite-based positioning systems such as the Russian Global Navigational Positioning System (GLONASS) or other ground or near ground radio signal based geographic positioning systems. Therefore, It should be recognized that it is not necessary to use centimeter accuracy RTK GPS for time tagging seeds or plants as they are planted. Any centimeter accuracy GPS could be used, and data may be post-processed using, for example, correction factors provided by the GPS equipment manufacturer over the Internet, to generate a planting map.

Figure 2:
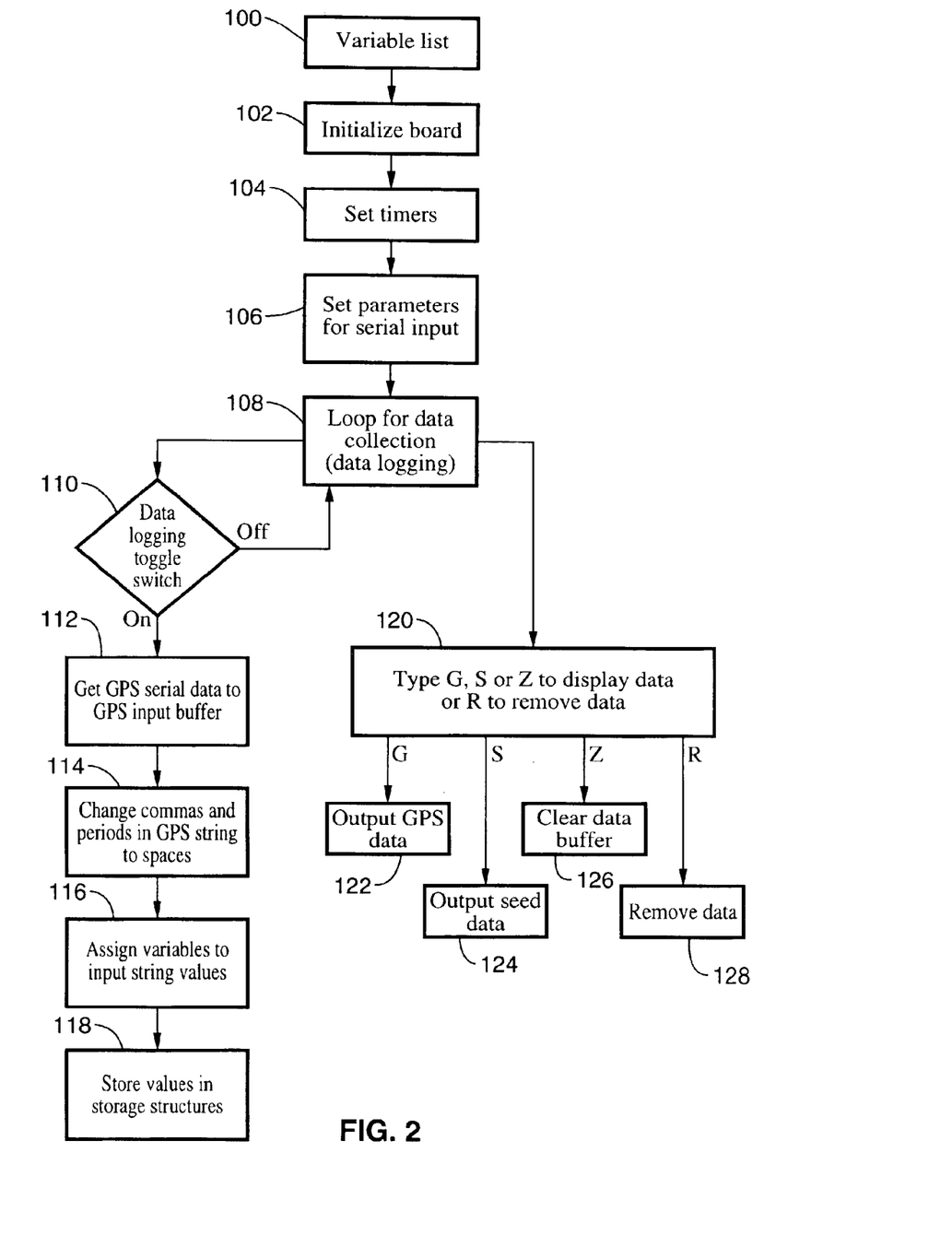
FIG. 2 is a flow chart of an embodiment of a data acquisition process according to the present invention.

Referring now to FIG. 2, computer software associated with first data acquisition unit 16 and second data acquisition unit 18 preferably processes the seed data from optical sensors 22 and the GPS location data to estimate the exact coordinates of each seed and the distance from the adjacent seed. The computer program preferably converts the raw data from the planter hardware into centimeter accurate plant maps. FIG. 2 shows the process flow for an embodiment of a data acquisition program according to the present invention. An example of C program code corresponding to this flow chart is set forth in Appendix A which is on CD-ROM.

As generally seen in the flowchart of FIG. 2, the software preferably collects, stores and displays certain GPS and seed data. Preferably, the PJK string is used for this purpose. While the VTG string may provide the velocity of the vehicle in knots or kilometers per hour (kph), it was not found to be very useful at low speeds due to poor accuracy. The PJK string typically contains the UTC time, Northing, Easting, and GPS quality. UTC time is what the preferred system is based on for both the GPS coordinates and the seed events. The Northing and Easting give the global coordinates of the GPS antenna 28. The GPS quality indicates whether centimeter accuracy information is being obtained. In RTK GPS, this is referred to as "RTK fixed". Some providers of RTK GPS equipment, such as Trimble, Inc., refer to this level of quality as "3".

Therefore it is preferred that the system software ensure that the PJK string is present in the received GPS signal. To do so, a program statement may be used to make sure that there is a PJK output; if there is not, then a simple "NO" is displayed and "No Output" logged in the recorded data. It is also important to ensure that the PJK string is being read by the system. If one of the strings is not seen, then a flag on cab display 34 alerts the driver of the situation. If the VTG string is used as well, the same methodology could be used to ensure the presence of the VTG string.

Referring more specifically to the process flow shown in FIG. 2, a variable list is consulted at block 100 and the data acquisition units are then initialized at block 102. At block 104 the timers in first data acquisition unit 30 are set with GPS receiver 26. Optionally, the timers in the second data acquisition unit 32 are set. The parameters for serial input are then set at block 106 after the timers and the planting device should be ready for planting and mapping activities.

In the embodiment described in FIG. 2, the operator of the equipment physically sets a toggle switch at block 110. The data stream will be directed to temporary or permanent storage when the toggle switch is in the "on" position. When the toggle switch is "on," the program will obtain GPS serial data and place it into the GPS input buffer at block 112; change the commas and periods in the GPS string to spaces at block 114, and assign variables to input string values at block 116 in embodiment shown. Once the GPS input string values are derived at block 116, the values art stored in temporary or permanent memory or other storage device at block 118.

When the data logging toggle switch is in the "off" position, the data from collection loop 108 may be directed to a display at block 120 or cleared. For example, by entering the appropriate input command, such as G, S, Z or R, the GPS data would be displayed at block 122 (command G), the seed data would be displayed at block 124 (command S), the GPS data and seed data summary would be displayed at block 126 (command Z), or the stored data would be removed at block 128 (command R).

It will be appreciated that the accuracy of the GPS position points is vital to the effectiveness of the system. One difficulty experienced with current RTK GPS positioning systems, however, is that GPS coordinates often do not all lie on a straight line even though the operator of the vehicle drives "straight" through the field. This is typically due to track and cross track errors. To overcome this difficulty, the present invention preferably uses the most recent three RTK fixed data points to reduce error through a minimization technique described herein. Alternatively, the invention can employ an algorithm to minimize the cross track error by regressing a line through the RTK GPS points and then dropping a perpendicular from observed RTK GPS points to predict the corrected positions. Either approach improves the accuracy of the seed map.

To achieve centimeter accuracy according to the present invention, the RTK GPS quality must be "RTK fixed" or "3" as those terms are used in connection with currently available centimeter accuracy RTK GPS equipment. For purposes of the following discussion, this GPS quality will be referred to as "3" as used to indicate centimeter accuracy equipment provided by Trimble, Inc. It will be appreciated, however, that future centimeter accuracy equipment or equipment with even higher resolution could be developed that uses other indicators of the desired quality, and that the invention could easily be adapted to use those indicators as well.

Accordingly, the present invention utilizes quality "3" GPS signals as an indicator of centimeter accuracy. In addition, the invention continuously performs instantaneous ground wheel calibrations which can be used for position prediction purposes if a quality "3" GPS signal is unavailable. The preferred software of the first data acquisition unit 16 uses a mathematical procedure which utilizes three consecutive quality "3" GPS points to interpolate the antenna location in UTM coordinates as will now be described with reference to FIG. 3 and FIG. 4.

Figure 3:
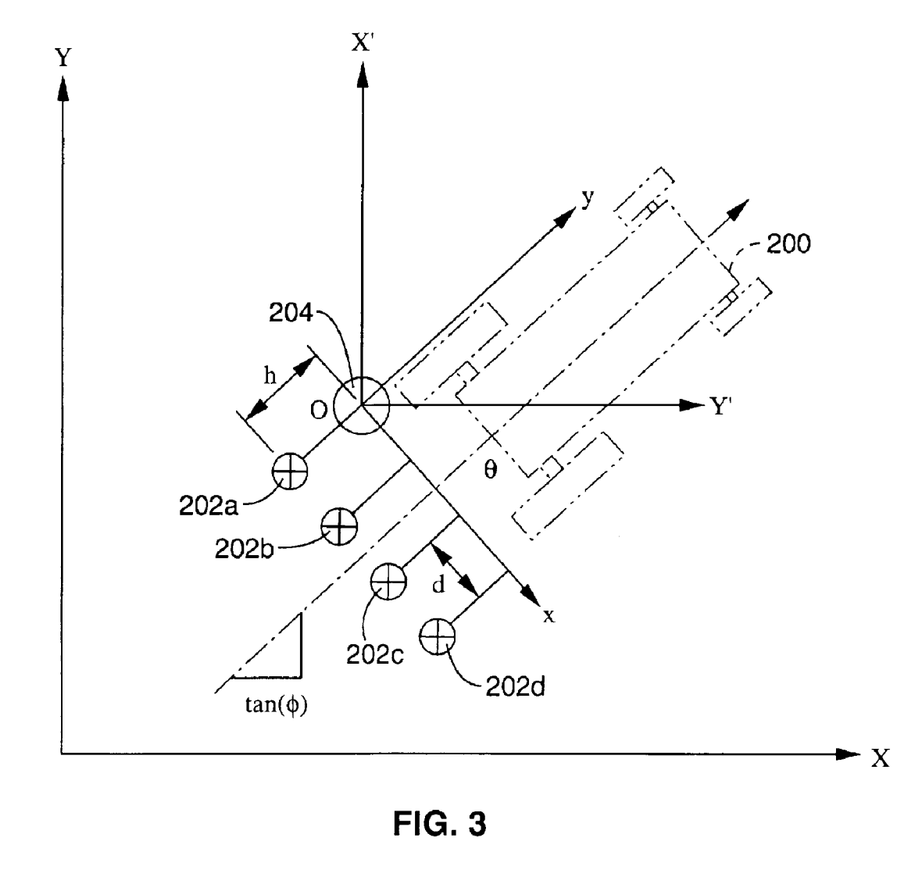
FIG. 3 is a diagram of a coordinate system employed to provide antenna and seed location using Eulerian transformation according to the present invention.

Referring to FIG. 3, a planter vehicle 200 is schematically shown with coordinates and variables used to interpolate data to provide antenna location in UTM coordinates during a seed event and seed location based on GPS antenna location. In the embodiment shown in FIG. 3, planter vehicle 200 has four seed planter units 202a, 202b, 202c, 202d and a GPS antenna 204.

(a) GPS Antenna Location.

An interpolation technique which utilizes time-tags is used for determining GPS antenna locations during seed dispensing events. Let the coordinates $(X_i, Y_i)$, $(X_j, Y_j)$, and $(X_k, Y_k)$ be the RTK GPS positions determined by a quality "3" GPS signal, and let $t_i$, $t_j$, and $t_k$ be the time-tags corresponding to these RTK GPS positions respectively. A linear regression line can be drawn between these three locations using the following model:

$$x_l = a\tau_l \quad (1)$$

$$y_l = b\tau_l \quad (2)$$

$$v = \alpha N \text{ or } N = \beta v \quad (3)$$

where $$x_l = X_l - \bar{X}; \bar{X} = \frac{\sum X_l}{3}$$

$$y_l = Y_l - \bar{Y}; \bar{Y} = \frac{\sum Y_l}{3}$$

$$\tau_l = t_l - \bar{t}; \bar{t} = \frac{\sum t_l}{3}$$

subscript $l = i, j,$ or $k$ $\sum$ = sum over $i, j,$ and $k$ $a, b, \alpha$ = regression parameters.

$\beta = 1/\alpha$

Note that the regression parameters a and b represent velocities along Northing and Easting directions. The regression parameter $\beta$ is related to $\alpha$ which represents an instantaneous wheel calibration constant. The regression parameters a, b, and $\alpha$ can be determined by minimizing the sum of squared error (SSE) which is given by:

$$SSE = \sum (x_l - a\tau_l)^2 + \sum (y_l - b\tau_l)^2 + \sum \left(N_l - \beta\sqrt{a^2+b^2}\right)^2 \quad (4)$$

Note that $v=\sqrt{a^2+b^2}$. The minimization of SSE is equivalent to taking partial derivatives of SSE with respect to a, b, and $\beta$ and equating them to zero., i.e.

$$\frac{\partial SSE}{\partial a} = 0, \frac{\partial SSE}{\partial b} = 0, \text{ and } \frac{\partial SSE}{\partial \beta} = 0.$$

This process results in following equations for a, b, $\beta$:

$$a = \frac{\sum x_l \tau_l}{\sum \tau_l^2} \quad (5)$$

$$b = \frac{\sum y_l \tau_l}{\sum \tau_l^2} \quad (6)$$

$$\beta = \frac{3\sqrt{a^2+b^2}}{\sum N_l} \quad (7)$$

Once a and b are known, positions corresponding to any time-tag $t_l$ such that $t_i < t_l < t_k$, can be determined by equations (1) and (2). The regression parameter $\beta$ which is equal to $1/\alpha$ can provide some check on the accuracy. It may also be useful to locate $(X_k, Y_k)$, if RTK GPS quality corresponding to $t_k$ is not equal to "3". Moreover, tan $(\phi)=b/a$ is a measure of the direction or heading in which the antenna is moving. This information is essential to determine the seed location form the antenna location.

(b) Seed Location Based on GPS Antenna Location.

The location of each of the seeds that are planted may be determined based on the GPS antenna location. In FIG. 3, XY is a right handed, global, Cartesian coordinate system that provides the UTM coordinates of the RTK GPS antenna located at point O on the planter which is the location of the GPS antenna 204. The UTM coordinates of the antenna are $(X_0, Y_0)$. In addition, X'Y' is another coordinate system located at point O that is parallel to the global coordinate system XY. Moreover, xy is a right handed, local, Cartesian coordinate system such that its origin is at O and the y axis is parallel to the direction of travel of the tractor 300. The heading of the tractor, $\phi$, is the angle the direction of travel makes with the global X axis. To locate the seeds in the global coordinate system (UTM coordinates) the coordinates of the planting units 202 are determined.

Assume that the coordinates of each of the four planting units 202a, 202b, 202c, 202e are (–h, 0), (–h, d), (–h, 2d), and (–h, 3d), respectively, in the local coordinate system. This local coordinate system is related to the X'Y' coordinate system by a rotation angle, $\theta$, which is related to the heading, $\phi$. Once the rotation angle is known, the coordinates of the planting units 302 can be determined by Eulerian transformation as follows:

$$\left\{ \begin{array}{c} X' \\ Y' \end{array} \right\} = \left[ \begin{array}{cc} \cos(\theta) & -\sin(\theta) \\ \sin(\theta) & \cos(\theta) \end{array} \right] \left\{ \begin{array}{c} x \\ y \end{array} \right\} \quad (8)$$

where (x, y) is the coordinate of the seed in the local coordinate system and (X', Y') is the coordinate of the seed in the X'Y' coordinate system. The coordinates of the seed in the global coordinate system is given by:

$$X = X_0 + X' \quad (9a)$$

$$Y = Y_0 + Y' \quad (9b)$$

where (X, Y) is the global or UTM coordinates of the seed. The relationship between rotation angle $\theta$ and heading $\phi$ depends on the particular quadrant in which the planter is in while moving in its travel direction. These relationships are summarized below:

(i) Both $v_x$ (i.e. a) and $v_y$ (i.e. b) are positive:

$$\theta = -(90-\phi) \quad (10a)$$

(ii) Both $v_x$ and $v_y$ are negative:

$$\theta = (90+\phi) \quad (10b)$$

(iii) $v_x > 0$ and $v_y < 0$:

$$\theta = (90-\phi) \quad (10c)$$

(iv) $v_x < 0$ and $v_y > 0$:

$$\theta = -(90+\phi) \quad (10d)$$

While the coordinates of the four planting units in the foregoing example were expressed in terms of (−h, 0), (−h, d), (−h, 2d), and (−h, 3d), it will be appreciated that a calibration procedure could be used to locate the coordinates of each of the planting units (e.g., $(h_i, d_i)$ where i=1 to n). For example, the first step in the calibration process would be to drive the planting vehicle to an arbitrary calibration site, logging the RTK GPS location. This provides the heading of the planting vehicle. Next, the planting vehicle would be stopped and the GPS antenna position logged. At that location, a few seeds would be dispensed. Next, using the RTK range pole the seed location would be identified. Using the transformation in Eq. 8, $(h_i, d_i)$ for each unit planting would be obtained. For example, for the four planting units discussed above, the coordinates would be expressed in terms of $(h_1, d_1)$, $(h_2, d_2)$, $(h_3, d_3)$, $(h_4, d_4)$, respectively.

Figure 4:
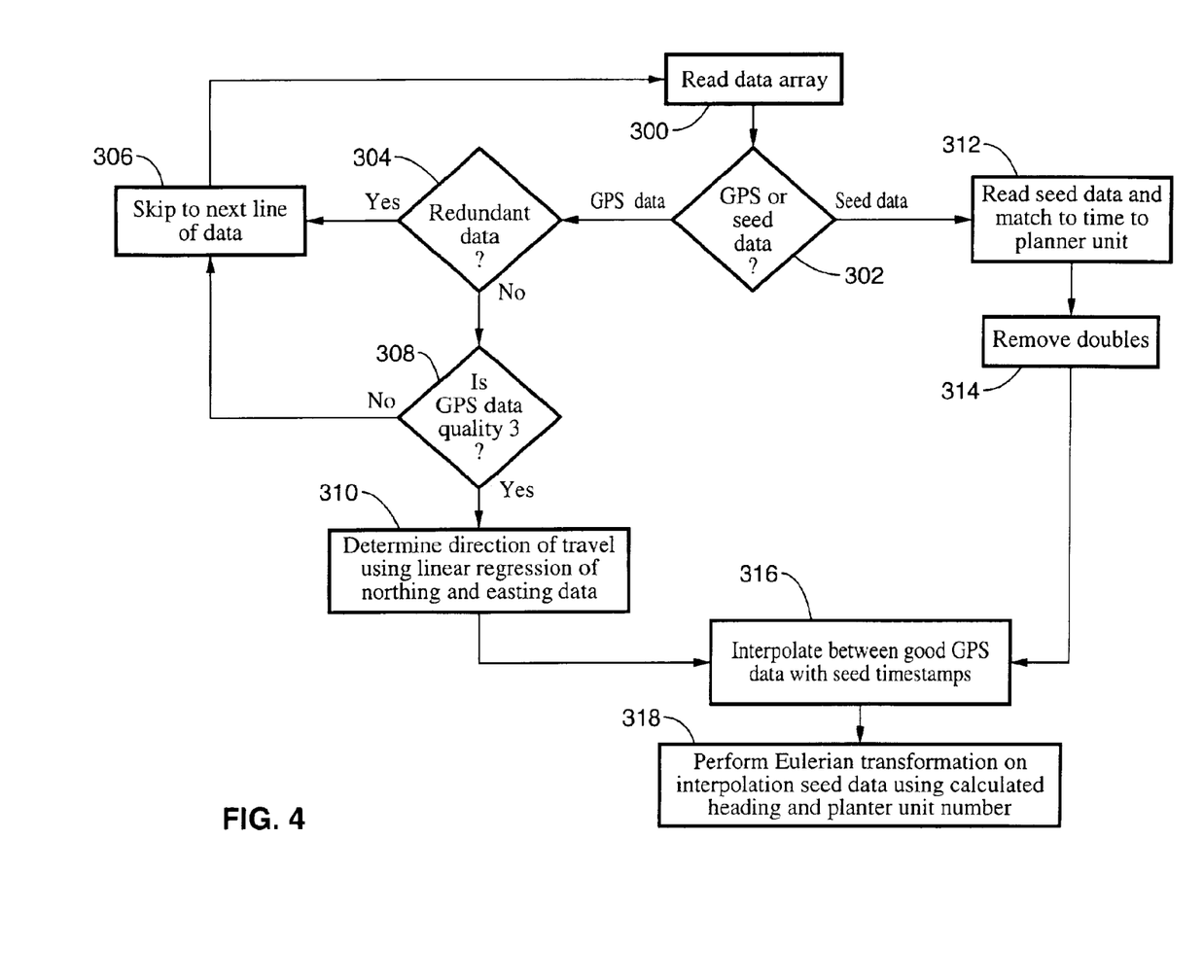
FIG. 4 is a flow chart of an embodiment of a seed mapping process according to the present invention.

FIG. 4 shows the process flow for an embodiment of a seed mapping program using foregoing data processing techniques according to the present invention. An example of visual basic program code corresponding to this flow chart is set forth in Appendix B which is on CD-ROM.

First, the GPS or seed data array that has been stored or logged in real time is read at block 300. The data is then segregated into seed data and GPS data at block 302. If the data is GPS data, the program determines if the GPS data is redundant at block 304. If the GPS data is redundant, the line of data is skipped at block 306 and the next line of the data array is read at block 300. If the data is not redundant at block 304, the quality of the data is determined at block 308. If the data is not quality "3" then the line of data is skipped at block 306 and the next line of the data array is read at block 300. If the quality of the GPS data is "3" then the direction of travel is determined using linear regression of the Northing and Easting data at block 310.

If the data from the data array is seed data at block 302, then the seed data is read to match the time to the planting unit at block 312. Duplicate seed data entries are then removed at block 314. An interpolation between the good quality "3" GPS data at block 308 and the seed data timestamps at block 312 is then conducted at block 316. A Eulerial transformation of the interpolation data from block 316 using calculated heading and planter unit numbers is then performed at block 318 to provide centimeter accurate seed map UTM coordinates.

Thus far the invention has been described in terms of generating a map based as a function of sensing seeds as they are dispensed and using RTK GPS to map the location in response. However, the invention can also used to control the seed dispensing operation itself. In that case, the sensors are not required. For example, vacuum planters typically employ a vacuum controlled metering plate as a seed dispenser. The seeds are held on one side of the plate by a vacuum imparted on the opposite side of the plate through small holes in the plate. When the vacuum is cut off, the seeds fall off the plate and are dispensed through the tubes. The invention would use RTK GPS to determine when the seed dispenser (or tube) is located above a predetermined planting location. The planting locations could be recorded in a software map, lookup table or the like, or comprise geographical distance offsets from a reference location. When the desired location has been reached, the invention then cuts off the vacuum to dispense the seeds. By dropping the seeds at the desired location in this manner, check row planting is made possible. The planting map in this embodiment is the same type of planting map as described previously, but is generated as a function of the invention dictating where the seeds are dispensed instead of as a function of sensing where the seeds are dispensed. This approach is applicable to dispensing vegetation as well. Those skilled in the art will appreciate that conventional control hardware and programming techniques would be used to implement this embodiment of the invention, and that first data acquisition unit 30 previously described would typically comprise a conventional data acquisition and control unit with the functions described implemented in software.

EXAMPLE 1

A four row Salvo 650 vacuum planter was retrofitted with a complete set of 4700 series centimeter accuracy surveying and mapping system comprising a base unit, a rover, radio link, and other accessories provided by Trimble Navigation Ltd. Two single board data loggers were used to acquire data in real-time and display it in the tractor cab. The first data logger was interfaced to the centimeter accuracy GPS unit, the optical sensors, an encoder, and an accelerometer. The second data logger was interfaced to a display unit mounted in the cab. The two data loggers and the GPS receiver were mounted in a rugged, weatherproof metal box and secured to the planter frame. The accelerometer and GPS antenna were installed on the top of the toolbar frame. The GPS antenna was directly ahead of planter unit #1. The accelerometer was included to monitor the planter dynamics since it was thought to be a critical issue in determining seed dynamics; however, the information was found not to be important. Four optical sensors (one per planter unit) were mounted directly above planter shoes and detected the seeds as they fell through seed tubes. Originally a radar was included to measure planter travel speed. However, we found that the radar speed sensor was not accurate enough for our purpose especially at low speed. We replaced the radar with a wheel encoder that was capable of producing 256 pulses per revolution of the wheel. The encoder was mounted on the planter frame and was connected to the left planter wheel to measure its rotation. The first data logger obtained the GPS time and UTM co-ordinates every second and stored them with a reference time (time-tag). This data logger also monitored the optical sensors, time-tagged the seed events, and stored the information in the memory. The second data logger monitored the first data logger and reported planter's performance through the display unit mounted in the tractor cab. A permanent base station was installed in the field. A surveyed point at the Davis, Calif. airport was used to determine the exact location of the field base station.

EXAMPLE 2

Preliminary tests indicated that all of the sensors and the GPS unit were working. Following the preliminary tests, field tests were conducted over two planting seasons to check the performance of the plant mapping system. In the first year, four rows were planted during each pass through a 165-ft. test plot. Corn seed (hybrid: Pioneer 3162 R24) was planted at a depth of two inches and an operating speed of 2 mph. In each row, 15-ft sections were marked consecutively. Three of the eleven 15-ft sections were selected at random for analysis. The sections were measured by the Trimble RTK surveying equipment. The distance between the plants was also measured with a tape measure in order to check the accuracy of the Trimble surveying equipment. A computer program was written to process the seed and GPS location data and estimate the exact coordinates of each seed and its distance from the adjacent seed. When we examined the RTK GPS position, we found that they did not all lie on a straight line even when the operator drove "straight" through the field. We felt that there were some along track and cross track errors. Our algorithm minimized the cross track error by regressing a line through the RTK GPS points and then dropping a perpendicular from observed RTK GPS points to predict the corrected positions. We felt that this approach improved our seed map accuracy. During the first year trails we achieved a seed map accuracy of 1.8 to 2.1 inches with respect to the actual plant map. We also felt that there was a need to correct along track error. We hypothesized that if we knew the true ground speed of the planter, then we may be able to minimize the along track error using statistical techniques. We felt that the radar gun was not providing an accurate enough speed measurement, especially at low ground speed. We also wondered whether the RTK GPS could provide an accurate and independent measure of ground speed. Our investigation revealed that the velocity value of the "VTG" string outputted from the RTK GPS did not have enough accuracy at low ground speeds. Finally we decided to replace the radar with a wheel encoder as mentioned earlier. However, subsequent trials in the second year indicated that perhaps our "straight" operation of the tractor was not straight enough at the centimeter level and indeed RTK GPS was recording positions very accurately. The RMS error value of the RTK GPS during this test was 8.7 mm.

EXAMPLE 3

We learned that RTK GPS quality was very important. As long as RTK GPS quality was "3" we were guaranteed centimeter accuracy. We developed an algorithm that utilized only quality "3" GPS signals and continuously performed instantaneous ground wheel calibration which could be used for prediction purposes if a quality "3" GPS signal was unavailable. The interpolation technique provides the antenna location in UTM coordinates. To obtain the exact location of the seeds it was necessary to implement an Eluerian rotation scheme.

This modified scheme was tested during the second year of this study. Some of the early plantings indicated that we were not receiving quality "3" signal most of the time. It turned out that the base station antenna was not high enough. In response, we constructed a tall tower (about 12-ft. tall) to mount the antenna near the base station. Elevating the antenna at the base station virtually eliminated problems with RTK GPS signal quality.

The sensitivity of optical sensors was found to be the major cause for higher errors (about 1.9 in.) in certain trials. The optical passage confirmation sensors are designed to detect any material that passes through the 21×21-mm (0.83 in) window of the sensor. The sensor circuit was modified in order to change the range in which seed particles were detected. The modification allowed us to adjust the sensor amplification so the sensors would see objects that were the size of a corn seed but not see objects such as small rocks and dust particles. These modifications helped to improve the seed map accuracy in comparison to plant map to about 1.2 to 1.5 in. This accuracy is very good for the purpose of implementing plant-specific cultivation.

In evaluating the performance of the planter two distinct cases are of interest:

(i) A seed was seen by the optical sensor, but no plant ever germinated in the vicinity of that site. This could be due to over sensitivity of the optical sensor, seed viability, and birds and/or rodents eating the seed;

(ii) A seed was not seen at a location but a plant did germinate there. This is due to the error in detecting seeds.

It is preferable to have a small amount error of the type listed under (i) above. This type of error, if not excessive, provides us a certain degree of protection against mistaking a plant as a weed and killing it. However, we want the second type of error to be negligible. A plant seen at a location near which no seeds were seen would be treated as a weed and eliminated. So we used second criterion as a measure of our planter performance. In other words, we looked for the closest seed to a germinated plant and used this distance as a measure of our accuracy; the smaller this distance the is better the accuracy.

By successfully creating plant maps the door is open to continue research on plant specific weed control which can reduce the amount of pesticide applied. It is believed that plant-specific cultivation can reduce pesticide application by approximately 24% to approximately 51%, thus saving at least $40 to $50/acre. This approach not only reduces the chemical cost, it also protects the environment by reducing herbicide load.

It will be appreciated, therefore, that the potential advantages of a centimeter accuracy planting system according to the present invention in agricultural production include:

1. Plant specific pesticide spraying;
2. Weed specific herbicide spraying;
3. Plant specific foliar application of fertilizer;
4. Plant specific pesticide spraying and weed specific herbicide spraying in one field operation;
5. Weed specific herbicide spraying, and plant specific foliar application of fertilizer in one field operation;
6. Plant thinning (removal of excess plants);
7. Mechanical cultivation around the plants;
8. Automatic adjustment of plant population based on top soil depth.

All of the above except weed-specific herbicide spraying can be achieved if the planter is equipped with a centimeter accuracy GPS system as described herein, since location of seeds and therefore subsequent locations of plants can be mapped while planting. To achieve weed-specific herbicide spraying, a greenness sensor (e.g., a near-infrared optical sensor) is used to detect all vegetative mass in the field. Vegetative mass where plants are not expected based on a plant map are designated as weeds and can be sprayed.

Accordingly, it will be seen that this invention provides a simple and effective way to precisely map seed plantings in a field and display the data to the operator in the cab of the tractor. Ultra-precise seed maps can assist with post planting field operations such as plant specific chemical applications to the individual crop pants such as pesticide spraying or the plant specific foliar application of fertilizer. Likewise, chemical applications to undesirable weeds by weed specific herbicide sprayings can be conducted without harming the crop plants. Non-chemical weeding can also be conducted through mechanical cultivation, electrical shock or flaming of weeds between crop plants or other methods of weed eradication without exposing the crop plants to damage. In addition, weed specific herbicide sprayings or mechanical cultivation will allow the adjustment of plant population based on topsoil. Finally, operator fatigue can also be reduced by autonomous guidance of the machinery and seeding data and map.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. In an automated planting apparatus having a dispenser for seed or vegetation, the improvement comprising a radio signal based system associated with said planting apparatus for activating said dispenser at a predetermined geographic location for precision planting, and for identification of said geographic location for post planting field operations.

2. An improvement as recited in claim 1, wherein said system comprises:
   a data acquisition and control unit coupled to said dispenser; and
   a radio signal based geographic positioning system coupled to said data acquisition and control unit.

3. An improvement as recited in claim 2, further comprising programming associated with said data acquisition and control unit for carrying out the operations of:
   monitoring geographic location information from said geographic positioning system;
   determining if a predetermined geographic location has been reached; and
   activating the dispenser at said predetermined geographic location.

4. An improvement as recited in claim 3, further comprising programming associated with said data acquisition and control unit for carrying out the operations of determining the geographic location of a receiving antenna associated with said geographic positioning system.

5. An improvement as recited in claim 4, further comprising programming associated with said data acquisition and control unit for carrying out the operations of determining if said predetermined geographic location has been reached based on said antenna location.

6. An improvement as recited in claim 2, further comprising programming associated with said data acquisition and control unit for mapping the location of dispensed seeds or vegetation.

7. An improvement as recited in claim 3, further comprising programming associated with said data acquisition and control unit for carrying out the operations of:
   determining the geographic location of a receiving antenna associated with said geographic positioning system; and
   determining if said predetermined geographic location has been reached based on said antenna location.

8. An improvement as recited in claim 3, further comprising programming associated with said data acquisition and control unit carrying out the operations of:
   determining the geographic location of a receiving antenna associated with said geographic positioning system;
   determining if said predetermined geographic location has been reached based on said antenna location: and
   mapping the location of dispensed seeds or vegetation.

9. An improvement as recited in claim 1, wherein said system comprises:
   a data acquisition and control unit coupled to said dispenser;
   a radio signal based geographic positioning system coupled to said data acquisition and control unit: and
   programming associated with said data acquisition and control unit carrying out the operations of
      determining if a predetermined geographic location has been reached,
      activating the dispenser at said predetermined geographic location, and
      mapping the geographic location of dispensed seeds or vegetation.

10. An improvement as recited in claim 9, further comprising programming associated with said data acquisition and control unit for carrying out the operations of determining the geographic location of a receiving antenna associated with said geographic positioning system.

11. An improvement as recited in claim 10, further comprising programming associated with said data acquisition and control unit for carrying out the operations of determining if said predetermined geographic location has been reached based on said antenna location.

12. An improvement as recited in claim 9, further comprising programming associated with said data acquisition and control unit for carrying out the operations of:
   determining the geographic location of a receiving antenna associated with said geographic positioning system: and
   determining if said predetermined geographic location has been reached based on said antenna location.

13. An improvement as recited in claim 1, wherein said system comprises:
   a data acquisition and control unit coupled to said dispenser;
   a radio signal based geographic positioning system coupled to said data acquisition and control unit; and
   programming associated with said data acquisition and control unit carrying out the operations of determining the geographic location of a receiving antenna associated with said geographic positioning system, determining if a predetermined geographic location at which to dispense seeds or vegetation has been reached based on said antenna location, activating the dispenser at said predetermined geographic location, and mapping the geographic location of dispensed seeds or vegetation.

14. An improvement as recited in claim 1, wherein said system comprises:

a data acquisition and control unit coupled said dispenser;

a GPS-based geographic positioning receiver;

a GPS-based geographic positioning base station configured for providing geographic location reference information to said receiver; and programming associated with said data acquisition and control unit carrying out the operations of determining the geographic location of an antenna associated with said receiver, determining if a predetermined geographic location has been reached based on said antenna location, and activating said dispenser at said predetermined geographic location.

15. An improvement as recited in claim 1, wherein said system comprises:

a data acquisition and control unit coupled said dispenser;

a GPS-based geographic positioning receiver;

a GPS-based geographic positioning base station configured for providing geographic location reference information to said receiver; and programming associated with said data acquisition and control unit carrying out the operations of determining the geographic location of an antenna associated with said receiver, determining if a predetermined geographic location has been reached based on said antenna location, activating said dispenser at said predetermined geographic location, and mapping the geographic location of dispensed seeds or vegetation.

16. An improvement as recited in claim 6, further comprising means for detecting green vegetation and identifying that vegetation that does not correspond to seeds or vegetation previously mapped.

17. An improvement as recited in claim 6, further comprising a sensor system configured for detecting green vegetation and identifying that vegetation that does not correspond to seeds or vegetation previously mapped.

18. A method of controlling weeds using an improved automated planting apparatus as recited in claim 6, comprising applying chemical or non-chemical weed control to vegetation that does not correspond to seeds or vegetation previously mapped.

19. A method as recited in claim 18, wherein said non-chemical weed control is selected from the group consisting essentially of mechanical cultivation, pulsed electrical shock, and flame weeding.

20. A method for precision planting comprising:

providing an automated planting apparatus having a dispenser for seed or vegetation, said apparatus having a radio signal based system for activating said dispenser at a predetermined geographic location for precision planting and for identification of said geographic location for post planting field operations;

determining if a predetermined geographic location has been reached; and activating said dispenser at said predetermined geographic location.

21. In an automated planting apparatus having a dispenser for seed or vegetation, the improvement comprising:

a data acquisition and control unit coupled to said dispenser; and a radio signal based geographic positioning system coupled to said data acquisition and control unit.

22. An improvement as recited in claim 21, further comprising programming associated with said data acquisition and control unit for carrying out the operations of:

monitoring geographic location information from said geographic positioning system;

determining if a predetermined geographic location has been reached; and activating the dispenser at said predetermined geographic location.

23. An improvement as recited in claim 22, further comprising programming associated with said data acquisition and control unit for carrying out the operations of determining the geographic location of a receiving antenna associated with said geographic positioning system.

24. An improvement as recited in claim 23, further comprising programming associated with said data acquisition and control unit for carrying out the operations of determining if said predetermined geographic location has been reached based on said antenna location.

25. An improvement as recited in claim 21, further comprising programming associated with said data acquisition and control unit for mapping the location of dispensed seeds or vegetation.

26. An improvement as recited in claim 21, further comprising programming associated with said data acquisition and control unit for carrying out the operations of:

determining the geographic location of a receiving antenna associated with said geographic positioning system; and determining if said predetermined geographic location has been reached based on said antenna location.

27. An improvement as recited in claim 21, further comprising programming associated with said data acquisition and control unit carrying out the operations of:

determining the geographic location of a receiving antenna associated with said geographic positioning system;

determining if said predetermined geographic location has been reached based on said antenna location; and mapping the location of dispensed seeds or vegetation.

28. An improvement as recited in claim 25, further comprising means for detecting green vegetation and identifying that vegetation that does not correspond to seeds or vegetation previously mapped.

29. An improvement as recited in claim 25, further comprising a sensor system configured for detecting green vegetation and identifying that vegetation that does not correspond to seeds or vegetation previously mapped.

30. A method of controlling weeds using an improved automated planting apparatus as recited in claim 25, comprising applying chemical or non-chemical weed control to vegetation that does not correspond to seeds or vegetation previously mapped.

31. A method as recited in claim 30, wherein said non-chemical weed control is selected from the group consisting essentially of mechanical cultivation, pulsed electrical shock, and flame weeding.

32. A method for precision planting using an apparatus as recited in claim 21, comprising:
   determining if a predetermined geographic location has been reached; and
   activating said dispenser at said predetermined geographic location.

33. In an automated planting apparatus having a dispenser for seed or vegetation, the improvement comprising:
   a data acquisition and control unit coupled to said dispenser;
   a radio signal based geographic positioning system coupled to said data acquisition and control unit; and
   programming associated with said data acquisition and control unit carrying out the operations of
      determining if a predetermined geographic location has been reached,
      activating the dispenser at said predetermined geographic location, and
      mapping the geographic location of dispensed seeds or vegetation.

34. An improvement as recited in claim 33, further comprising programming associated with said data acquisition and control unit for carrying out the operations of determining the geographic location of a receiving antenna associated with said geographic positioning system.

35. An improvement as recited in claim 34, further comprising programming associated with said data acquisition and control unit for carrying out the operations of determining if said predetermined geographic location has been reached based on said antenna location.

36. An improvement as recited in claim 33, further comprising programming associated with said data acquisition and control unit for carrying out the operations of:
   determining the geographic location of a receiving antenna associated with said geographic positioning system; and
   determining if said predetermined geographic location has been reached based on said antenna location.

37. An improvement as recited in claim 33, further comprising means for detecting green vegetation and identifying that vegetation that does not correspond to seeds or vegetation previously mapped.

38. An improvement as recited in claim 33, further comprising a sensor system configured for detecting green vegetation and identifying that vegetation that does not correspond to seeds or vegetation previously mapped.

39. A method of controlling weeds using an improved automated planting apparatus as recited in claim 33, comprising applying chemical or non-chemical weed control to vegetation that does not correspond to seeds or vegetation previously mapped.

40. A method as recited in claim 39, wherein said non-chemical weed control is selected from the group consisting essentially of mechanical cultivation, pulsed electrical shock, and flame weeding.

41. A method for precision planting using an apparatus as recited in claim 33, comprising:
   determining if a predetermined geographic location has been reached; and
   activating said dispenser at said predetermined geographic location.

42. In an automated planting apparatus having a dispenser for seed or vegetation, the improvement comprising:
   a data acquisition and control unit coupled to said dispenser;
   a radio signal based geographic positioning system coupled to said data acquisition and control unit; and
   programming associated with said data acquisition and control unit carrying out the operations of
      determining the geographic location of a receiving antenna associated with said geographic positioning system,
      determining if a predetermined geographic location at which to dispense seeds or vegetation has been reached based on said antenna location,
      activating the dispenser at said predetermined geographic location, and
      mapping the geographic location of dispensed seeds or vegetation.

43. An improvement as recited in claim 42, further comprising means for detecting green vegetation and identifying that vegetation that does not correspond to seeds or vegetation previously mapped.

44. An improvement as recited in claim 42, further comprising a sensor system configured for detecting green vegetation and identifying that vegetation that does not correspond to seeds or vegetation previously mapped.

45. A method of controlling weeds using an improved automated planting apparatus as recited in claim 42, comprising applying chemical or non-chemical weed control to vegetation that does not correspond to seeds or vegetation previously mapped.

46. A method as recited in claim 45, wherein said non-chemical weed control is selected from the group consisting essentially of mechanical cultivation, pulsed electrical shock, and flame weeding.

47. A method for precision planting using an apparatus as recited in claim 42, comprising:
   determining if a predetermined geographic location has been reached; and
   activating said dispenser at said predetermined geographic location.

48. In an automated planting apparatus having a dispenser for seed or vegetation, the improvement comprising:
   a data acquisition and control unit coupled said dispenser;
   a GPS-based geographic positioning receiver;
   a GPS-based geographic positioning base station configured for providing geographic location reference information to said receiver; and
   programming associated with said data acquisition and control unit carrying out the operations of
      determining the geographic location of an antenna associated with said receiver,
      determining if a predetermined geographic location has been reached based on said antenna location,
      activating said dispenser at said predetermined geographic location, and
      mapping the geographic location of dispensed seeds or vegetation.

49. An improvement as recited in claim 48, further comprising means for detecting green vegetation and identifying that vegetation that does not correspond to seeds or vegetation previously mapped.

50. An improvement as recited in claim 48, further comprising a sensor system configured for detecting green vegetation and identifying that vegetation that does not correspond to seeds or vegetation previously mapped.

51. A method of controlling weeds using an improved automated planting apparatus as recited in claim 48, comprising applying chemical or non-chemical weed control to vegetation that does not correspond to seeds or vegetation previously mapped.

52. A method as recited in claim 51, wherein said non-chemical weed control is selected from the group consisting essentially of mechanical cultivation, pulsed electrical shock, and flame weeding.

53. A method for precision planting using an apparatus as recited in claim 48, comprising:
   determining if a predetermined geographic location has been reached; and
   activating said dispenser at said predetermined geographic location.

54. A precision farming method, comprising:
   monitoring geographic location information from a radio signal based geographic positioning system;
   determining if a predetermined geographic location has been reached;
   activating a seed or vegetation dispenser on a planting apparatus at said predetermined geographic location.

55. A method as recited in claim 54, further comprising:
   determining the geographic location of a receiving antenna associated with said geographic positioning system; and
   determining if said predetermined geographic location has been reached based on said receiving antenna location.

56. A method as recited in claim 55, further comprising generating a map recording the location of said dispensed seed or vegetation.

57. A method as recited in claim 56, further comprising using said map for a post planting field operation.

58. A method as recited in claim 57, wherein said post planting field operation is selected from the group consisting of applying pesticides directly to the plants, cultivating, applying herbicides to control weeds, applying pulsed electrical shock to weeds, and flame weeding.

59. A precision farming method, comprising:
   monitoring geographic location information from a radio signal based geographic positioning system;
   determining the geographic location of a receiving antenna associated with said geographic positioning system;
   determining if a predetermined geographic location has been reached based on said receiving antenna location;
   activating a seed or vegetation dispenser on a planting apparatus at said predetermined geographic location; and
   generating a map recording the location of said dispensed seed or vegetation.

60. A method as recited in claim 59, further comprising using said map for a post planting field operation.

61. A method as recited in claim 60, wherein said post planting field operation is selected from the group consisting of applying pesticides directly to the plants, cultivating, applying herbicides to control weeds, applying pulsed electrical shock to weeds, and flame weeding.

* * * * *